United States Patent
Putman et al.

(10) Patent No.: US 8,227,650 B2
(45) Date of Patent: Jul. 24, 2012

(54) PROCESS AND CATALYST FOR SELECTIVE HYDROGENATION OF DIENES AND ACETYLENES

(75) Inventors: Hugh M. Putman, Pasadena, TX (US); John R. Adams, Salem, OR (US)

(73) Assignee: Catalytic Distillation Technologies, Pasadena, TX (US)

( * ) Notice: Subject to any disclaimer, the term of this patent is extended or adjusted under 35 U.S.C. 154(b) by 0 days.

(21) Appl. No.: 12/859,975

(22) Filed: Aug. 20, 2010

(65) Prior Publication Data

US 2010/0317906 A1    Dec. 16, 2010

Related U.S. Application Data

(62) Division of application No. 11/048,563, filed on Feb. 1, 2005, now abandoned.

(51) Int. Cl.
*C07C 5/09* (2006.01)

(52) U.S. Cl. ........ 585/258; 585/250; 585/259; 585/260; 585/261; 585/262

(58) Field of Classification Search .......... None
See application file for complete search history.

(56) References Cited

U.S. PATENT DOCUMENTS

| | | | | |
|---|---|---|---|---|
| 3,900,526 A | * | 8/1975 | Johnson et al. | 585/261 |
| 4,210,768 A | * | 7/1980 | Swift | 585/250 |
| 4,215,011 A | | 7/1980 | Smith, Jr. | |
| 4,242,530 A | | 12/1980 | Smith, Jr. | |
| 4,302,356 A | | 11/1981 | Smith, Jr. | |
| 4,307,254 A | | 12/1981 | Smith, Jr. | |
| 4,336,407 A | | 6/1982 | Smith, Jr. | |

(Continued)

FOREIGN PATENT DOCUMENTS

CL        04051997        3/1997

(Continued)

OTHER PUBLICATIONS

Notification of Transmittal of the International Search Report and the Written Opinion of the International Searching Authority, or Declaration for PCT/US05/38926 (Aug. 14, 2007) (8 pages).

(Continued)

*Primary Examiner* — Tam M Nguyen
(74) *Attorney, Agent, or Firm* — Osha • Liang LLP

(57) ABSTRACT

A process for the selective hydrogenation of dienes and acetylenes in a mixed hydrocarbon stream from a pyrolysis steam cracker in which a front end a one step acetylene hydrogenation is carried out using catalyst comprising (A) 1 to 30 wt. % based on the total weight of the catalyst of a catalytic component of nickel only or nickel and one or more elements selected from the group consisting of copper, rhenium, palladium, zinc, gold, silver, magnesium, molybdenum, calcium and bismuth deposited on (B) a support having the a BET surface area of from 1 to about 100 $m^2$/gram, total nitrogen pore volume of from 0.2 to about 0.9 cc/gram and an average pore diameter of from about 110 to 450 Å under conditions of temperature and pressure to selectively hydrogenate acetylenes and dienes. The process hydrogenates the dienes and acetylenes to olefins without loss of ethylene and propylene in the light and heavy products which eliminates the need for further processing of the heavier stream. In addition the amount of polymerization in the lower part of the distillation column reactor is reduced.

7 Claims, 1 Drawing Sheet

U.S. PATENT DOCUMENTS

| | | | | |
|---|---|---|---|---|
| 4,440,956 A | * | 4/1984 | Couvillion | 585/260 |
| 4,443,559 A | | 4/1984 | Smith, Jr. | |
| 4,734,534 A | * | 3/1988 | Cymbaluk | 570/216 |
| 4,748,290 A | * | 5/1988 | Cymbaluk | 585/271 |
| 5,679,241 A | | 10/1997 | Stanley et al. | |
| 5,730,843 A | | 3/1998 | Groten et al. | |
| 5,807,477 A | * | 9/1998 | Hearn et al. | 208/238 |
| 5,877,363 A | * | 3/1999 | Gildert et al. | 585/260 |
| 6,090,270 A | * | 7/2000 | Gildert | 208/57 |
| 6,169,218 B1 | | 1/2001 | Hearn et al. | |
| 6,747,181 B1 | * | 6/2004 | Bosman et al. | 585/259 |
| 6,759,562 B2 | | 7/2004 | Gartside et al. | |
| 7,408,089 B2 | * | 8/2008 | Ryu | 585/259 |
| 7,838,710 B2 | * | 11/2010 | Ryu | 585/274 |
| 2003/0171629 A1 | | 9/2003 | Ryu et al. | |
| 2005/0209491 A1 | * | 9/2005 | Ryu | 585/259 |

FOREIGN PATENT DOCUMENTS

| | | |
|---|---|---|
| CN | 1141622 A | 1/1997 |
| CN | 1552816 A | 12/2004 |
| WO | 9515934 A1 | 6/1995 |

OTHER PUBLICATIONS

Written Opinion issued in Singapore Application No. 200705447-1 dated Jun. 17, 2008 (5 pages).

Office Action for related Indonesian Application No. W-00200702423, dated Jun. 22, 2009 (2 pages).

Second Office Action from related Chilean Application No. 2938-2005 dated Dec. 10, 2009. (8 pages).

The First Office Action issued in related Chinese Application No. 200580047460.9 dated Feb. 24, 2010. (14 pages).

English Abstract of Chinese Publicaiton No. 1552816 dated Dec. 8, 2004.

English Abstact of Chinese Publication No. 1141622 dated Jan. 29, 1997.

Second Office Action issued in related Chinese Application No. 200580047460.9 dated Feb. 24, 2011. (5 pages).

* cited by examiner

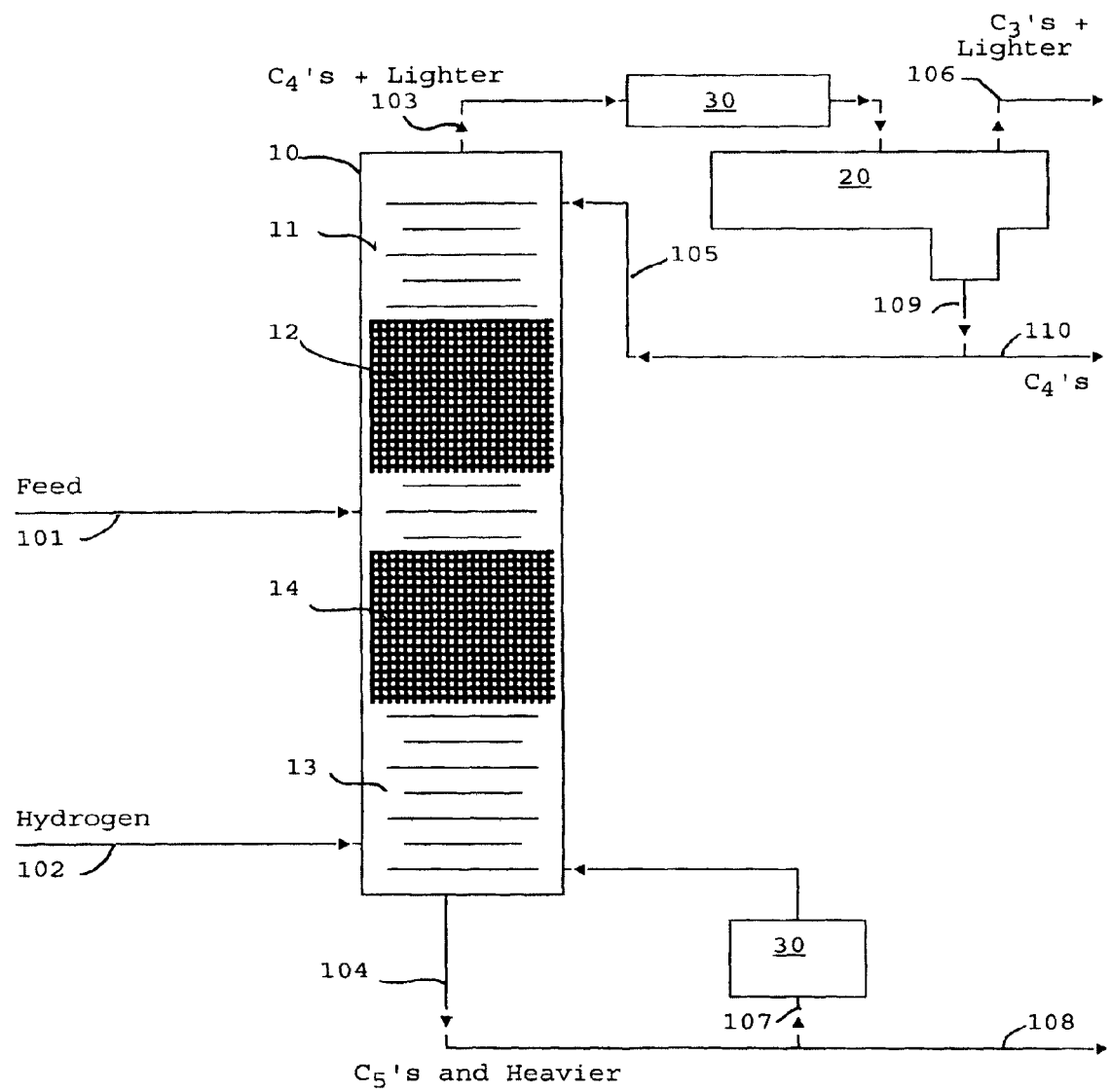

PROCESS AND CATALYST FOR SELECTIVE HYDROGENATION OF DIENES AND ACETYLENES

CROSS-REFERENCE TO RELATED APPLICATION

This application, pursuant to 35 U.S.C. §120, claims benefit to U.S. patent application Ser. No. 11/048,563, filed Feb. 1, 2005. That application is incorporated by reference in its entirety.

FIELD OF THE INVENTION

The present invention relates to a process and catalyst for the selective hydrogenation of dienes and acetylenes in a hydrocarbon stream containing hydrogen, methane, and $C_2$s to $C_8$s and heavier. More particularly the invention relates to a process wherein the hydrocarbon stream is fed between catalyst beds contained within a distillation column reactor. More particularly the invention relates to a process which utilizes a novel catalyst.

RELATED ART

The vapor product stream from the quench system of a hydrocarbon steam cracker typically consists mainly of hydrogen, methane, $C_2$-$C_6$ olefins and paraffins, $C_2$-$C_6$ acetylenes and dienes, benzene, toluene, xylenes, and other $C_6$+ components. Separation and recovery of the products according to carbon number is generally accomplished in a sequential distillation system after the first separation of hydrogen from the methane in a high pressure cold box system. The design of the distillation system is complicated by the fact that the differences in relative volatility of the olefins, acetylenes, and dienes of the same carbon number are small making it difficult to produce the pure olefin products. One method of circumventing this problem is to first separate the carbon number fractions and then to selectively hydrotreat each fraction to convert the acetylene and/or diene to its corresponding olefin or paraffin. This so called "back end" approach requires a separate hydrotreating system for each carbon number fraction as well as the addition of a requisite amount of hydrogen to each system. An alternative method is to hydrotreat the feed stream before separation using the contained hydrogen as the source of hydrogen for the conversion. This so-called "front end" approach has the advantage of removing a significant portion of the hydrogen from the feed stream to the cold box thereby reducing the size and refrigeration requirements of the cold box.

The invention outlined in U.S. Pat. No. 5,679,241 proposes a one step conversion of all $C_2$ to $C_5$ and heavier acetylenes and dienes without the hydrogenation of the $C_2$ or $C_3$ olefins. The patent relates to a system that is described as being capable of removing 70% or more of the hydrogen in the cracked gas prior to the required cryogenic separation by the hydrogenation of the $C_2$ to $C_4$ acetylenes and dienes and the $C_4$ and heavier olefins to paraffins. Removal of 70% or more of the hydrogen improves the economics through a significant lowering of the energy requirements for the separation of the $C_2$ and heavier components. By reducing the hydrogen partial pressure, separation is achieved at lower pressures and with reduced refrigeration. However, the patentees did not disclose a specific catalyst only "hydrogenation catalyst". In U.S. Pat. No. 6,759,562 B2 which is commonly owned by the owner of U.S. Pat. No. 5,679,241 the patentees therein allege that the process described in U.S. Pat. No. 5,679,241 cannot be operated as a single step system without substantial loss of ethylene and propylene. However, since there was no disclosed catalyst, the later patentees made their evaluation with a catalyst that is described only as a typical front end acetylene hydrogenation catalyst containing less than 2000 ppm Pd. The later patentee purports to improve the process by adding polishing or trim reactors in addition to the main reactor. This prior art relied on known available front end catalyst for their process developments, without ever recognizing the significance of a proper and novel catalyst as the way to solve the problems associated with the prior one step front end hydrogenation.

It is an advantage of the present invention that novel catalyst has been developed to make a one step front end acetylene hydrogenation operable without the loss of ethylene. A particular advantage of the process is that the acetylenes and dienes in both the heavy and light products will be hydrogenated thus eliminating the need for further processing of the heavy products. It is a further advantage that the amount of polymerization in the lower portion of the distillation column reactor is reduced. It is also an advantage of the present process that ethylene and propylene contents are not reduced in the treated streams.

SUMMARY OF THE INVENTION

The present invention is a novel catalyst and the hydrogenation process using the novel catalyst for removing acetylenes and dienes contained within a product stream from a pyrolysis plant in a single step. Briefly the present process for the selective hydrogenation of acetylenes and dienes in a mixed hydrocarbon stream containing $C_1$ to $C_8$ hydrocarbons comprising contacting a mixed hydrocarbon stream containing $C_1$ to $C_8$ hydrocarbons, including ethylene, acetylenes and dienes and hydrogen with a catalyst comprising (A) 1 to 30 wt. % based on the total weight of the catalyst of a catalytic component of nickel only or nickel and one or more elements selected from the group consisting of copper, rhenium, palladium, zinc, gold, silver, magnesium, molybdenum, calcium and bismuth deposited on (B) a support having the a BET surface area of from 1 to about 100 $m^2$/gram, total nitrogen pore volume of from 0.2 to about 0.9 cc/gram and an average pore diameter of from about 110 to 450 Å under conditions of temperature and pressure to selectively hydrogenate acetylenes and dienes.

In one embodiment the selective hydrogenation of the acetylenes and dienes is carried out in a distillation column reactor wherein the charge gas from the pyrolysis plant is fed between two beds of hydrogenation catalyst with additional hydrogen added as needed below the beds. The added hydrogen is controlled such that a minimum of hydrogen exits the distillation column reactor in the overheads to reduce the load on the downstream processing equipment.

The catalyst used is nickel alone or in combination with an element selected from the group consisting of copper, rhenium, palladium, zinc, gold, silver, magnesium, molybdenum calcium and bismuth. The amount of the copper, rhenium, palladium, zinc, gold, silver, magnesium, molybdenum calcium and bismuth modifiers on the catalyst is relatively small compared to the amount of Ni, i.e., less than about 5% of based on the Ni component on the support. The metals (or oxides thereof) are deposited on a support having a BET surface area of from about 1 to about 100 $m^2$/g, total nitrogen pore volume of from 0.2 to about 0.9 cc/g, and an average pore diameter of 110 to 450 Å. The support is selected from the group consisting of alumina, silica, zirconia, talcite, silica alumina, and charcoal. Alumina is a preferred support, preferably alumina that has been calcined at a temperature in the range of 700 to 1200° C. The preferred catalyst will have at least 30%, more preferably at least 50% of the pores larger the 100 Å diameter and a total pore volume from about 0.2 cc/g to about 0.9 cc/g and ABD (apparent bulk density) from about 035 to about 0.75 g/cc.

BRIEF DESCRIPTION OF THE DRAWING

The FIGURE is a flow diagram in schematic form of a preferred embodiment of the invention.

DETAILED DESCRIPTION

In the process, the catalyst selectively hydrogenated dienes and acetylenes in a feed stream generally comprising hydrogen, methane, and $C_2$ and heavier components, such as the gas stream from a pyrolysis plant. The feed may contain low levels of CO. Hydrogen for consumption in the reaction is found in the feed, but additional hydrogen can be added if required. The catalyst hydrogenates the dienes and acetylenes but does not saturate ethylene or propylene in the feed stream. Thus depending on the mix of acetylenes and dienes, a net increase in the ethylene and propylene is often obtained.

The selective front-end hydrogenation catalyst for the present invention comprises a nickel component which may be nickel only or nickel and one or more elements selected from the group consisting of copper, rhenium, palladium, zinc, gold, silver, magnesium, molybdenum, calcium and bismuth which is deposited on a support component having the following physical properties: BET surface area of from 1 to about 100 $m^2$/gram, total nitrogen pore volume of from 0.2 to about 0.9 cc/gram and an average pore diameter of from about 110 to 450 Å. The support may be selected from the group consisting of alumina, silica, zirconia, talcite, silica alumina and charcoal. The catalyst will have a concentration on the catalyst from 1 to 30 wt. % based on the total weight of the catalyst. The copper, rhenium, palladium zinc, gold, silver, magnesium, molybdenum, calcium and bismuth modifiers which are present only in very small amounts, since the Ni is the major catalytic component, are believed to improve catalyst activity, stability and recovery of the desired olefinic compounds.

Fixed bed single pass reactors, adiabatic upflow or downflow reactors (boiling point reactors), pulse flow reactors, reactive distillation reactors, divided wall reactors and the like, which are capable of containing the catalyst and bring the reactants together under reaction conditions.

The preferred process is the combined distillation and reaction in a single vessel termed a distillation column reactor. The catalyst must then be prepared in the form of a catalytic distillation structure. The catalytic distillation structure must be able to function as catalyst and as mass transfer medium. The catalyst must be suitably supported and spaced within the column to act as a catalytic distillation structure. The catalytic distillation process employs a catalyst system (See U.S. Pat. Nos. 5,730,843; 4,302,356; and 4,215,011) which provides for both reaction and distillation concurrently in the same reactor, at least in part within the catalyst system. The method involved is briefly described as one where concurrent reaction and distillation occur in combination reaction-distillation structures which are described in several U.S. Patents, namely U.S. Pat. Nos. 4,242,530; 4,250,052; 4,232,177; 4,302,356; 4,307,254; and 4,336,407. Additionally U.S. Pat. Nos. 4,302,356 and 4,443,559 disclose catalyst structures which are useful as distillation structures.

In the usual application of a process where the catalyst serves as a distillation component, the equilibrium is constantly disturbed, thus driving the reaction toward completion, that is, the reaction has an increased driving force because the reaction products have been removed and cannot contribute to a reverse reaction (LeChatelier's Principle). Although the hydrogenation reactions have been described as reversible at elevated temperatures above about 900° F., under the temperature conditions employed in the present invention, the hydrogenation is not reversible and cannot be an incentive to use a catalytic distillation system.

It is believed that in the present reaction, catalytic distillation is a benefit first, because the reaction is occurring concurrently with distillation, and the initial reaction products and other stream components are removed from the reaction zone as quickly as possible, reducing the likelihood of side reactions. Second, because all the components are boiling, the temperature of reaction is controlled by the boiling point of the mixture at the system pressure. The heat of reaction simply creates more boil up but no increase in temperature at a given pressure. As a result, a great deal of control over the rate of reaction and distribution of products can be achieved by regulating the system pressure. Also, adjusting the throughput (residence time=liquid hourly space velocity$^{-1}$) gives further control of product distribution and to a degree control of the side reactions such as oligomerization. A further benefit that this reaction may gain from catalytic distillation is the washing effect that the internal reflux provides to the catalyst thereby reducing polymer build up and coking. Internal reflux may be varied over the range of 0.1 to 40 preferably 0.2 to 20 L/D (wt. liquid just below the catalyst bed/wt. distillate) and gives excellent results, and with the $C_1$-$C_5$ streams being usually in the range of 0.5 to 4.0 L/D.

Quite surprisingly the low hydrogen partial pressure used in the distillation system did not result in the failure of the hydrogenation which would have been expected based on the high hydrogen partial pressure found in the liquid phase systems which are the worldwide standard. Without limiting the scope of the invention it is proposed that the mechanism that produces the effectiveness of the present process is the condensation of a portion of the vapors in the reaction system, which occludes sufficient hydrogen in the condensed liquid to obtain the requisite intimate contact between the hydrogen and the highly unsaturated compounds in the presence of the catalyst to result in their hydrogenation. This phenomenon of condensation which is a constant factor in a distillation is believed to result in the same or better hydrogen availability, as the high pressure in the liquid phase, that is, the hydrogen is introduced into the liquid so that the hydrogenation occurs.

A catalyst packed column can be appreciated to contain a vapor phase and some liquid phase as in any distillation. The distillation column reactor is operated at a pressure such that the reaction mixture is boiling in the bed of catalyst. The present process operates at overhead pressure of said distillation column reactor in the range between 0 and 350 psig, preferably 170 and temperatures within said distillation reaction zone in the range of 40 to 300° F., preferably averaging about ° F. at the requisite hydrogen partial pressures. The feed weight hourly space velocity (WHSV), which is herein understood to mean the unit weight of feed per hour entering the reaction distillation column per unit weight of catalyst in the catalytic distillation structures, may vary over a very wide range within the other condition perimeters, e.g., 0.5 to 35.

The advantages of utilizing a distillation column reactor in the instant selective hydrogenation process lie in the better selectivity for the conversion of dienes and acetylenes, conservation of heat and the separation by distillation which can remove some undesirable compounds, e.g., the heavies, TBC and $C_5$'s and the distillation can concentrate desired components in the catalyst zone.

The temperature in the distillation column reactor is determined by the boiling point of the liquid mixture present at any given pressure. The temperature in the lower portions of the column will reflect the constitution of the material in that part of the column, which will be higher than the overhead; that is, at constant pressure a change in the temperature of the system indicates a change in the composition in the column. To change the temperature the pressure is changed. Temperature control in the reaction zone is thus effected by a change in pressure; by increasing the pressure, the temperature in the system is increased, and vice versa.

In a preferred process for the selective hydrogenation of acetylenes and dienes in a mixed hydrocarbon stream containing $C_1$ up to $C_8$ hydrocarbons comprising the steps of:
(a) feeding a stream containing hydrogen, ethylene, propylene, acetylenes, butenes and dienes to a distillation column reactor between two beds of selective hydrogenation catalyst;
(b) feeding hydrogen below the lowest of the two beds of selective hydrogenation catalyst;
(c) concurrently in said distillation column reactor:
   (i) reacting at least a portion of said acetylenes and dienes with hydrogen to produce mono olefins, and
   (ii) separating the mixed hydrocarbon stream into a lower boiling stream and a higher boiling stream by fractional distillation;
(d) removing the lower boiling stream from the distillation column reactor as overheads; and
(e) removing the higher boiling stream from the distillation column reactor as bottoms.

Referring now to the FIGURE there is depicted a simplified flow diagram of one embodiment of the invention. The feed from the pyrolysis plant containing hydrogen ethylene, propylene, butenes, acetylenes and dienes (see TABLE I) for a more complete description), is introduced to distillation column reactor 10 via flow line 101 in between two beds 12 and 14 of the catalyst as described. Above and below the beds are standard distillation structures 11 and 13 such as sieve trays, bubble cap trays or inert packing. Additional hydrogen to support the reaction, especially in the lower bed 14 is introduced via flow line 102. The lower boiling components, especially the $C_f$ to $C_4$'s boil up into the upper bed 12 where the dienes and acetylenes are selectively hydrogenated to ethylene, propylene and butenes. The higher boiling components, especially the $C_5$'s and heavier are distilled downward into the lower bed 14 where any acetylenes and heavier dienes are selectively hydrogenated to mono olefins. The upward flowing hydrogen fed via flow line 102 helps strip any lower boiling components in the lower bed 14 up to the upper bed 12 and out with the overheads.

The $C_4$'s and lighter are removed as overheads via flow line 103 with the $C_4$'s being condensed in condenser 30 and collected in receiver/separator 20. The uncondensed $C_3$ and lighter components are removed from the receiver/separator 20 via flow line 106 and sent to product recovery. The condensed $C_4$'s are removed via flow line 109 and sent to product recovery via flow line 110. A portion of the condensed $C_4$'s are returned to the distillation column reactor 10 as reflux via flow line 105.

The $C_5$'s and heavier components are removed as bottoms via flow line 104 with a portion being recirculated through reboiler 30 via flow line 107 to the bottom of the distillation column reactor 10. Bottoms products are taken via flow line 108.

The embodiment shown operates the distillation column reactor as a debutanizer removing $C_4$'s and lighter as overheads and $C_5$'s and heavier as bottoms. However, the distillation column reactor could be operated as a depropanizer, depentanizer or dehexanizer depending on the composition of the feed stream and the desired product streams.

EXAMPLE

A typical product stream from a pyrolysis plant having the composition as shown in TABLE I was fed into a distillation column reactor having a catalyst and structure as described. The conditions were as follows:

TABLE I

Total feed rate 53.8 lbs/hr
$CO/H_2$ ratio 0.008
Reflux Ratio 5:1
Average Catalyst temperature 210° F.
Pressure 170 psig

| Component | % |
|---|---|
| Hydrogen | 1.294 |
| Nitrogen | 16.726 |
| Carbon Monoxide | 0.454 |
| Ethane | 0.009 |
| Ethene | 26.698 |
| Ethyne | 0.420 |
| Propane | 0.263 |
| Propene | 17.240 |
| Propyne | 0.623 |
| Propadiene | 0.327 |
| Iso-butane | 0.205 |
| Iso-butene | 0.309 |
| 1-butene | 1.939 |
| 1,3-butadiene | 14.262 |
| n-butane | 3.547 |
| 1-buten-3-yne | 0.000 |
| t-2-butene | 1.076 |
| c-2-butene | 0.790 |
| 1,2-butadiene | 0.067 |
| n-pentane | 1.385 |
| 2M-1,3-butadiene | 3.061 |
| cyclohexane | 8.801 |
| Conversions in the reactor were as follows: | |
| Ethylene | −1.1 |
| Ethyne | 100 |
| Propene | −4.9 |
| Propyne | 100 |
| 1,3-butadiene | 98 |
| 2M-1,3-butadiene | 96 |
| hydrogen | 59.2 |

The results show significant increases in both ethylene and propylene.

What is claimed:
1. A process for the selective hydrogenation of acetylenes and dienes in a mixed hydrocarbon stream comprising contacting a mixed hydrocarbon stream including ethylene, acetylenes and dienes and hydrogen with a catalyst comprising (A) 1 to 30 wt. % based on the total weight of the catalyst of a catalytic component of nickel and one or more modifiers selected from the group consisting of copper, rhenium, palladium, zinc, gold, silver, magnesium, molybdenum, calcium and bismuth deposited on (B) a support having the a BET surface area of from 1 to about 100 $m^2$/gram, total nitrogen pore volume of from 0.2 to about 0.9 cc/gram and an average pore diameter of from about 110 to 450 Å under conditions of temperature and pressure to selectively hydrogenate acetylenes and dienes;

wherein the selective hydrogenation catalyst comprises less than about 5 wt % of the one or more modifiers, based on the total weight of nickel in (A).

2. The process according to claim 1, wherein said support is selected from the group consisting of alumina, silica, zirconia, talcite, silica alumina, and charcoal.

3. The process according to claim 2, wherein said support is alumina.

4. The process according to claim 3, wherein said alumina has been calcined at a temperature in the range of 700 to 1200° C.

5. The process according to claim 4 wherein said catalyst has at least 30% of the pores larger than 100 Å diameter and a total pore volume from about 0.2 cc/g to about 0.9 cc/g and ABD from about 035 to about 0.75 g/cc.

6. The process according to claim 5 wherein at least 50% of the pores are larger than 100 Å diameter.

7. The process according to claim 1 wherein said mixed hydrocarbon stream is from a pyrolysis plant.

* * * * *